United States Patent
Blum et al.

(10) Patent No.: US 6,493,432 B1
(45) Date of Patent: Dec. 10, 2002

(54) SYSTEM FOR ENSURING CALLING PARTY PRIVACY IN A CALL SCREENING SYSTEM

(75) Inventors: Diane Doran Blum, San Jose, CA (US); Mridu Garg, Chicago, IL (US); Andre Floyd Johnson, Naperville, IL (US); Lila Elizabeth Russ, Plainfield, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/489,862

(22) Filed: Jan. 24, 2000

(51) Int. Cl.[7] .............................. H04M 1/64; H04M 3/42
(52) U.S. Cl. ................ 379/88.12; 379/67.1; 379/88.19; 379/88.21; 379/88.22; 379/201.03; 379/207.12
(58) Field of Search ........................... 379/67.1, 70, 74, 379/77, 80, 88.04, 88.12, 88.15, 88.17, 88.18, 88.19, 88.21, 88.22, 201.01, 201.03, 201.06, 201.07, 201.11, 207.12, 207.13, 214.01

(56) References Cited

U.S. PATENT DOCUMENTS

| | | | | |
|---|---|---|---|---|
| 5,327,486 A | * | 7/1994 | Wolff et al. ............... | 379/93.23 |
| 5,471,519 A | * | 11/1995 | Howe et al. .............. | 379/88.26 |
| 5,652,789 A | * | 7/1997 | Miner et al. ................ | 379/201 |
| 5,742,905 A | * | 4/1998 | Pepe et al. .................. | 455/461 |
| 5,946,386 A | * | 8/1999 | Rogers et al. .............. | 379/265 |

* cited by examiner

Primary Examiner—Allan Hoosain
(74) Attorney, Agent, or Firm—Patton Boggs LLP

(57) ABSTRACT

The system for providing calling party privacy during subscriber call screening for a central office switching system enables a subscriber to monitor and intercept the last forwarded, active call to the Voice Messaging System, while providing the calling party with privacy as the voice messaging system provides the prerecorded instructions/message to the calling party. The calling party privacy feature delays call screening alerting to the subscriber to prevent the subscriber from monitoring the call connection until the calling party is recording their message on the voice messaging system. Depending on the method used, once the calling party privacy feature requirements are satisfied, the subscriber call screening system notifies the subscriber of the presence of a calling party who is recording a message for the subscriber on the Voice Messaging System.

23 Claims, 3 Drawing Sheets

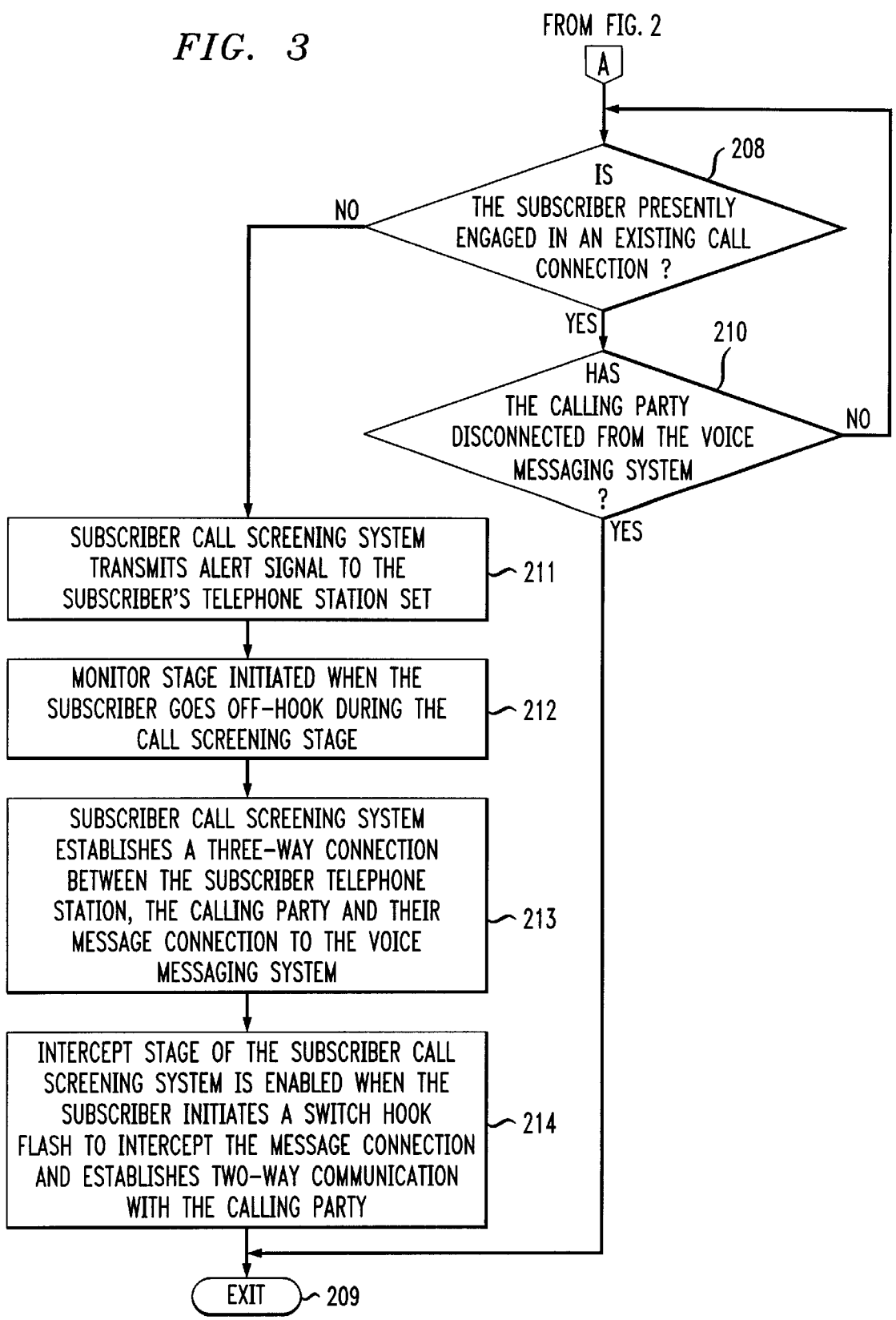

SYSTEM FOR ENSURING CALLING PARTY PRIVACY IN A CALL SCREENING SYSTEM

CROSS-REFERENCE TO RELATED APPLICATIONS

This application is related to U.S. patent application Ser. No. 09/134,267, titled "Method and Apparatus for Direct Voice Mail Screening, Monitoring, and Retrieval" filed on Aug. 14, 1998 and U.S. patent application Ser. No. 09/220,256, titled "Subscriber Directed Message Processing System" filed on Aug. 14, 1998.

FIELD OF THE INVENTION

This invention relates to telephone switching systems served by a Voice Messaging System which enables a calling party to leave a message for a subscriber and, in particular, to a subscriber call screening system that allows a subscriber to monitor the message being recorded by the calling party and ensures calling party privacy during voice mail announcements.

PROBLEM

There is a need in the field of telephone switching systems to provide the subscriber with increased functionality beyond the simple recording of messages from a calling party. In particular, the traditional answering machine system served as the mechanism to enable a calling party to alert the subscriber that a call was attempted, in the form of a brief audio message from the calling party regarding the reason for the call and the identity of the calling party. The subscriber can then later activate the answering machine system to retrieve these recorded messages. Customer premises-based answering machines typically also provide a rudimentary call screening capability. In particular, the answering machine outputs the entirety of the message recording transaction via a loudspeaker during the message recording process. This enables the subscriber to listen to the message as it is being recorded, and optionally pick up the telephone to barge in on the call connection and speak to the calling party.

In contrast, voice messaging services that are provided by centralized switching apparatus, such as central office switching systems and customer-premises switching systems, do not enable a subscriber to listen to and/or screen an incoming voice message as the calling party is presently recording the message. These central office switching systems redirect the incoming call connection to the voice messaging system as soon as the central office switching system call processing indicates that the voice message function is required. Thus, the traditional central office switching system based voice messaging systems simply enable a calling party to leave a message which the subscriber can later retrieve. The ability to screen calls forwarded to a voice messaging system has been requested by the telephone operating companies to increase the market penetration of revenue enhancing voice mail systems. Such a central office switching system based voice messaging call screening service has been generically proposed in GR-1512-Core, for Call Screening.

The problem that needs to be addressed is a privacy issue with regard to the call screening capability for calls forwarded to voice messaging systems. The calling party has an expectation of privacy during the time the voice messaging system provides the prerecorded instructions/message to the calling party and is thus likely to speak freely, not expecting their comments to be overheard or recorded during this process. If the subscriber can monitor the voice messaging connection, during this time interval, the calling party's comments are conveyed to the subscriber without the calling party being aware of this condition. Thus, in the field of central office switching systems, there is no capability to provide the calling party with privacy, as the voice messaging system provides the prerecorded instructions to the calling party.

SOLUTION

The above-described problem is solved and a technical advance achieved by the calling party privacy feature of a subscriber call screening system for a central office switching system, which enables a subscriber to monitor and intercept the last forwarded, active call to the Voice Messaging System, while providing the calling party with privacy as the voice messaging system provides the prerecorded instructions/message to the calling party. The calling party privacy feature delays call screening alerting to the subscriber to prevent the subscriber from monitoring the call connection until the calling party is recording their message on the voice messaging system. Depending on the method used, once the calling party privacy feature requirements are satisfied, the subscriber call screening system notifies the subscriber of the presence of a calling party who is recording a message for the subscriber on the Voice Messaging System.

BRIEF DESCRIPTION OF THE DRAWING

FIGS. 2 and 3 illustrate in flow diagram form the operation of the calling party privacy feature of the subscriber call screening system for a voice messaging system in processing a typical call scenario.

DETAILED DESCRIPTION

Figure 1:
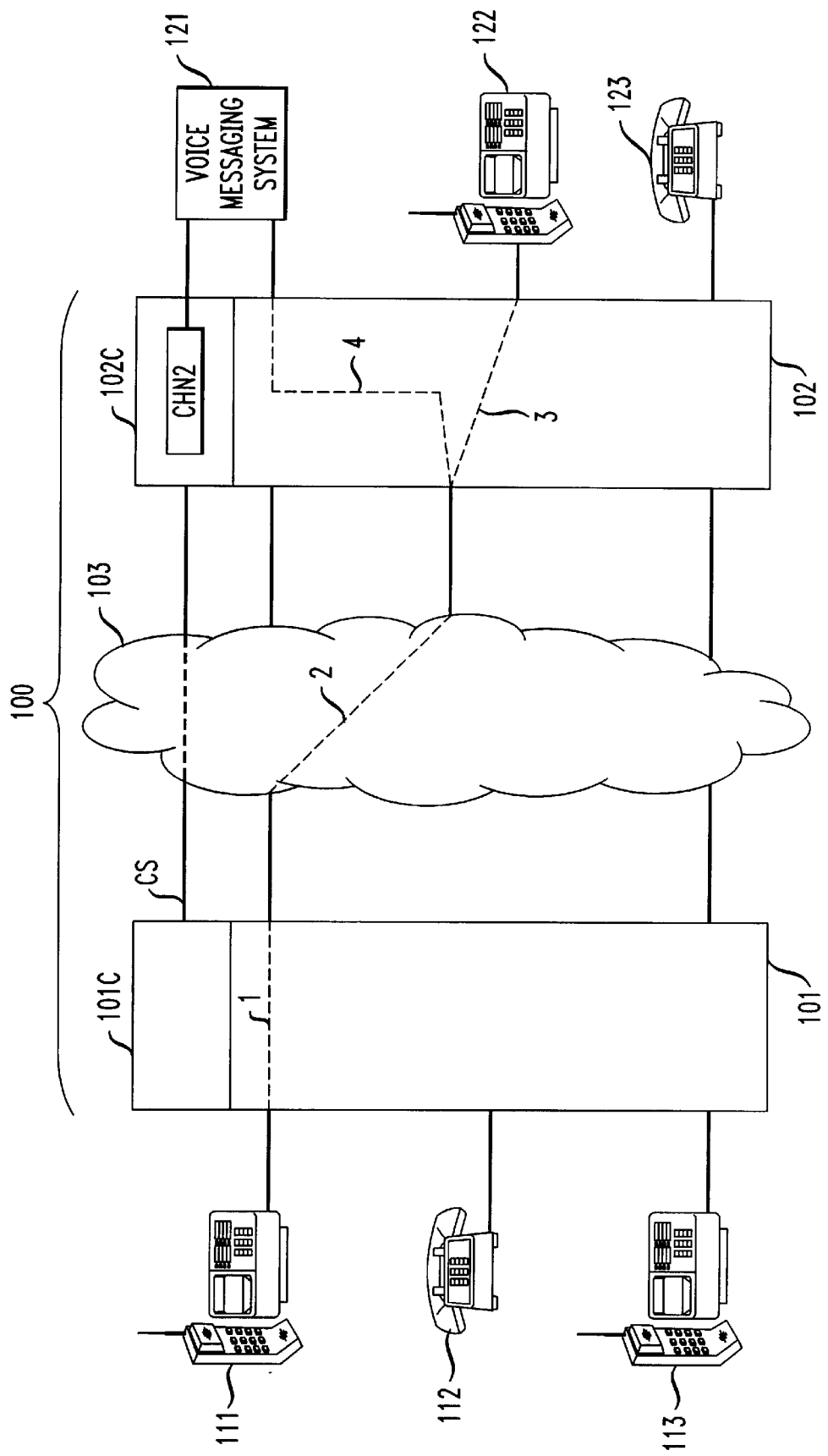
FIG. 1 illustrates in block diagram form, the overall architecture of the environment in which the subscriber call screening system and the calling party privacy feature are operational.

FIG. 1 illustrates in block diagram form, the overall architecture of the environment in which the subscriber call screening system and the calling party privacy feature are operational. In particular, the subscriber call screening system and the calling party privacy feature are operational in a communications network environment, such as in the local central office switch of the Public Switched Telephone Network (PSTN) or a customer premises based switching system or even an Internet Provider network (collectively termed "communications system" herein). The communications system offers a voice messaging service as part of its operational capabilities via an adjunct Voice Messaging System that is cooperatively operational with the communications system. The Voice Messaging System comprises a memory in which are stored the voice messages that are received from calling parties. The Voice Messaging System itself includes a message controller that regulates the storage and playback of the voice messages that are stored in memory.

Incoming Call Initiation

A calling party at telephone station set 111 initiates a call connection to the telephone station set 122 of the subscriber in well known manner through their local central office switch, communications system 101. In particular, the communications network comprises a traditional voice communications network that includes a plurality of local communications systems 101–102, such as telephone switching systems that are part of the Public Switched Telephone Network (PSTN) 100 and are interconnected via trunk circuits to an Interexchange Carrier System (IXC) 103. Each of the communications systems 101, 102 serve a plurality of telephone station sets and the communications systems 101, 102 may be interconnected via an out of band signaling link CS through the Interexchange Carrier System (IXC) 103, using the well known SS7 signaling protocol. The operation of such a communications network is well known and is not described in detail herein. The communications systems 101, 102 provide a set of features and services to the telephone station sets that they serve. In addition, an adjunct Voice Messaging System 121 is connected to communications system 102 to enable incoming calls to be redirected to the Voice Messaging System 121 to thereby enable a calling party to leave a voice message for subscribers of communications system 102. In addition, communications system 102 is equipped with the subscriber call screening system CHN2, that is operational in the controller 102C of the communications system 102. In this description, the subscriber call screening system CHN2 is shown as resident in the controller 102C, which transmits control data to the directly connected Voice Messaging System 121. Note that the call connection can be between telephone station sets (such as 123, 122) served by the same communications system 102. The example of the use of two communications systems 101, 102 to implement the call connection is selected for the purpose of illustration, not to limit the applicability of the concept taught herein.

Voice Mail Message Processing Example

Figure 2:
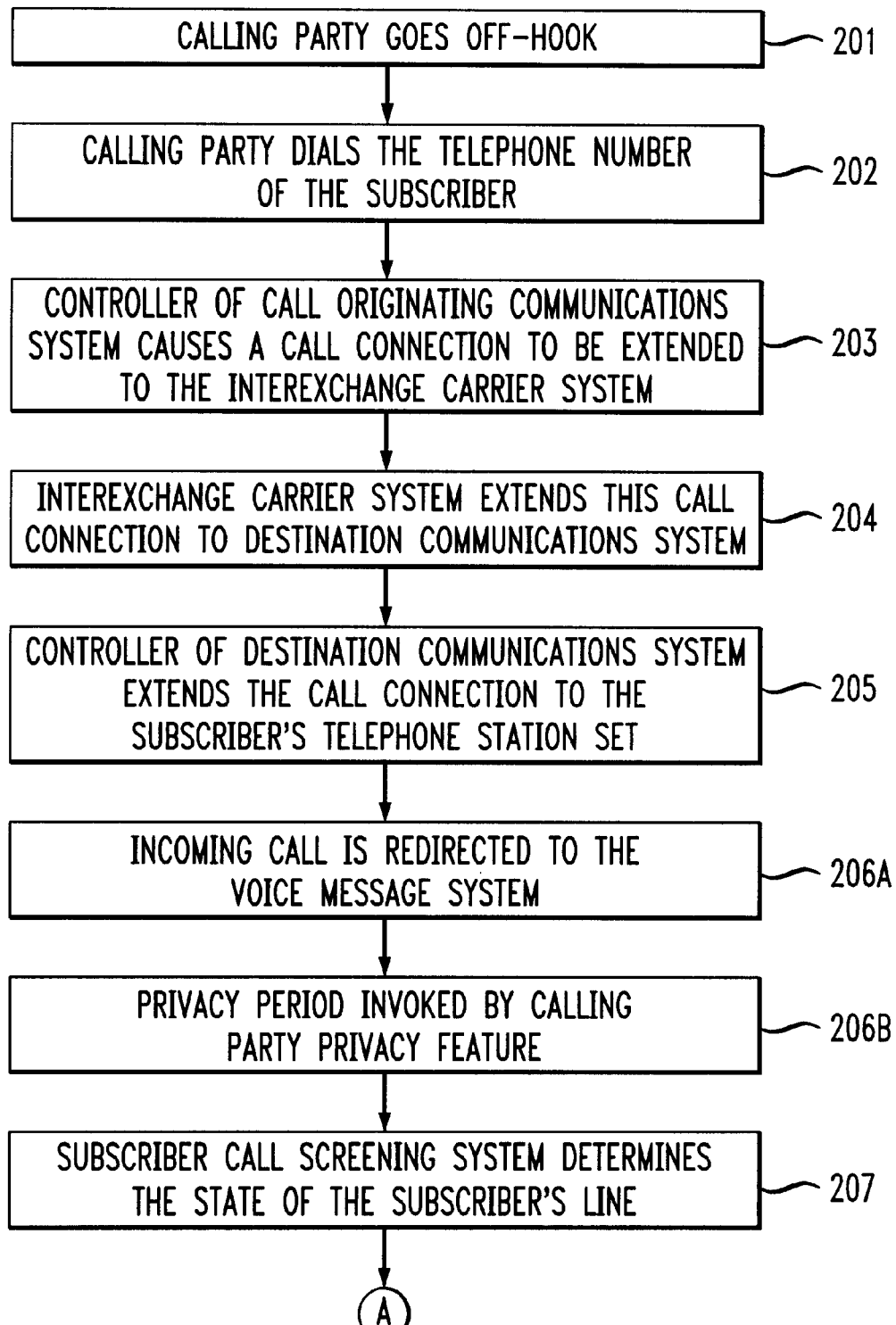

In order to illustrate the operation of the present subscriber call screening system for a voice messaging system CHN2, an example of a typical call connection is described, in flow diagram form in FIGS. 2 and 3, with respect to the system architecture of FIG. 1. In particular, a communication connection is established between the calling party, located at telephone station set 111, and the subscriber, located at telephone station set 122. This is accomplished for example by the calling party at telephone station set 111 going off-hook at step 201 and dialing the telephone number of the subscriber located at telephone station set 122 at step 202. In response to the dialed digits, the controller 101C of communications system 101 at step 203 causes a call connection to be extended over path 1 to the lnterexchange Carrier System 103, which, in response to control signals received from controller 101C over control channel CS, extends this call connection over path 2 to communications system 102 at step 204. The control signals originated by the controller 101C are propagated by the lnterexchange Carrier System 103 to the controller 102C of communications system 102. The controller 102C responds to the received control signals by further extending the call connection over path 3 to the telephone station set 122 of the subscriber at step 205. The subscriber is provided with a voice mail feature by use of the Voice Messaging System 121 by the communication system 102, which voice mail feature is activated in response to the occurrence of one of a plurality of conditions. For example, the subscriber may activate a do not disturb feature, which automatically redirects incoming calls that are directed to the subscriber telephone station set to the Voice Messaging System 121 over path 4. Alternatively, the subscriber may be active on the telephone station set 122 on an existing call connection, or the incoming call can be redirected to the Voice Messaging System 121 after a predetermined number of ringing cycles at the unanswered telephone station set 122. The telephone station set 122 can also be equipped with call screening redirection, where incoming calls from selected calling parties are automatically redirected to the Voice Messaging System 121.

In any case, once call processing determines that the incoming call is to be redirected to the Voice Messaging System 121, the incoming call is completed at step 206A through the telecommunication system 102 to the Voice Messaging System 121. Traditionally, this is the conclusion of the call processing as far as the subscriber's ability to intervene in this incoming call.

Call Screening with Calling Party Privacy Feature

Once the incoming call has been redirected to the Voice Messaging System at step 206A, the calling party privacy feature invokes the privacy period for the calling party at step 206B and thus delays the application of the special alert signal to the subscriber's telephone station set 122. This privacy period can be created in a number of ways. Calling party privacy can be provided until the prerecorded message provided by the Voice Messaging System completes, or a programmable timer can be used to ensure that a predetermined period of time has elapsed from the initial connection of the calling party to the voice messaging system, or a timer function can be enabled based upon the timeout of the event that initiated the call forwarding to the voice messaging system. In any of these instances or other like implementations, the subscriber call screening system CHN2 prevents or delays the subscriber from monitoring the call connection until the calling party begins recording their message on the voice messaging system to ensure privacy of the calling party. Once the calling party privacy feature delay processing has been completed, at step 207, the subscriber call screening system CHN2 determines the state of the subscriber's line. If the subscriber is presently engaged in an existing call connection, processing remains in the subscriber line condition determining state by cycling through the decision steps of step 208 where the present state of the redirected call is determined to ensure that the calling party is still on the message connection to the Voice Messaging System 121 and returns to step 207 where the subscriber call screening system CHN2 determines the state of the subscriber's line. If the calling party disconnects from the Voice Messaging System 121 at step 208 prior to the subscriber completing the existing call connection, then call processing exits at step 209, since the calling party is no longer present on a message connection to the Voice Messaging System 121 such that monitoring or intercept by the subscriber is then possible. Otherwise, if the subscriber is not engaged in an existing call, or has gone on-hook from an existing call connection while the calling party is still engaged in a message connection to the Voice Messaging System 121 at step 210, processing advances to step 211 where the subscriber call screening system CHN2 enters the call screening mode and transmits a special subscriber sensible alert signal to the subscriber's telephone station set 122 in the form of an audible and/or visual indication, such as a ping ring signal.

Once the call screening tone is provided, the call screening phase is initiated at step 213, which is the time during which the subscriber can go off-hook on the subscriber telephone station set 122 to engage the call screening function. If the calling party or the Voice Messaging System 121 terminates the message connection before the subscriber goes off-hook or the call screening time interval expires, the call is no longer available for screening and call processing exits at step 209. The next stage of the call screening function is the Monitor Stage, which is initiated at step 212 when the subscriber goes off-hook on the subscriber telephone station set 122 during the call screening stage to listen to the forwarded call (message connection) without the calling party's knowledge. In response to the subscriber going off-hook on the subscriber telephone station set 122, the subscriber call screening system CHN2 at step 214 establishes a three-way connection between the subscriber telephone station set 122, the calling party and their message connection to the Voice Messaging System 121, to monitor the calling party.

In addition, the monitor stage may have its duration limited to conserve the three way conference circuit resources. The Intercept Stage of the subscriber call screening system CHN2 is enabled by the subscriber at step 215 when the subscriber in the monitor stage initiates a switch hook flash to intercept the message connection and establish two way call communication with the calling party.

Call screening is activated and deactivated via dial codes that are entered by the subscriber in well known fashion. The subscriber call screening system CHN2 provides a confirmation tone when the subscriber activates or deactivates the call screening function.

Summary

The calling party privacy feature of a subscriber call screening system operates in central office switching systems to provide additional functionality by providing privacy to the calling party during the time interval when the voice messaging system provides the prerecorded instructions to the calling party. This privacy is provided by delaying the special alert signal, provided by the subscriber call screening system to the subscriber for a call eligible for screening, until the calling party is recording a message.

What is claimed:

1. In a telecommunications system, which enables a subscriber, using a subscriber telephone station set, to monitor and intercept the processing of an incoming message directed to said subscriber and that is presently being input into a voice messaging system by a calling party, a call screening system for providing calling party privacy, comprising:

means, responsive to an incoming message directed to said subscriber and that is presently being input into said voice messaging system by said calling party, for providing an indication to said subscriber telephone station set; and means for delaying activation of said means for providing during a programmable time period prior to said calling party recording said incoming message in said voice messaging system.

2. The call screening system for providing calling party privacy of claim 1 further comprising:

means, responsive to expiration of said time period prior to said calling party recording said incoming message in said voice messaging system and said subscriber generating a control indication using said subscriber telephone station set, for changing the present state of the message connection between said calling party and said voice messaging system to enable said subscriber to monitor said incoming message presently being input into a voice messaging system via said subscriber telephone station set.

3. The call screening system for providing calling party privacy of claim 1 wherein said means for delaying comprises:

means for identifying completion of a prerecorded message provided by said voice messaging system.

4. The call screening system for providing calling party privacy of claim 1 wherein said means for delaying comprises:

means for identifying completion of a predetermined time interval measured from initiation of said message connection.

5. The call screening system for providing calling party privacy of claim 1 wherein said means for delaying comprises:

means for identifying completion of a predetermined time interval measured from an event which initiated said message connection.

6. The call screening system for providing calling party privacy of claim 1 wherein said means for providing an indication comprises:

means for generating a subscriber sensible indication at said subscriber telephone station set, from the class of indications comprising: audible indication and visual indication.

7. The call screening system for providing calling party privacy of claim 1 wherein said means for changing comprises:

means for bridging said subscriber onto said message connection in a three-way call connection for the duration of said message connection.

8. The call screening system for providing calling party privacy of claim 7 wherein said means for bridging comprises:

means, responsive to a subscriber provided input, for terminating recording of said incoming message.

9. The call screening system for providing calling party privacy of claim 7 wherein said means for bridging comprises:

means, responsive to a subscriber provided input, for directly connecting said subscriber to said calling party.

10. In a telecommunications system, which enables a subscriber, using a subscriber telephone station set, to monitor and intercept the processing of an incoming message directed to said subscriber and that is presently being input into a voice messaging system by a calling party, a method operational in a call screening system for providing calling party privacy, comprising the steps of:

providing, in response to an incoming message directed to said subscriber and that is presently being input into said voice messaging system by said calling party, an indication to said subscriber telephone station set; and delaying activation of said step of providing during a programmable time period prior to said calling party recording said incoming message in said voice messaging system.

11. The method of call screening for providing calling party privacy of claim 10 further comprising the step of:

changing, in response to expiration of said time period prior to said calling party recording said incoming message in said voice messaging system and said subscriber generating a control indication using said subscriber telephone station set, the present state of the message connection between said calling party and said voice messaging system to enable said subscriber to monitor said incoming message presently being input into a voice messaging system via said subscriber telephone station set.

12. The method of call screening for providing calling party privacy of claim 10 wherein said step of delaying comprises:

identifying completion of a prerecorded message provided by said voice messaging system.

13. The method of call screening for providing calling party privacy of claim 10 wherein said step of delaying comprises:

identifying completion of a predetermined time interval measured from initiation of said message connection.

14. The method of call screening for providing calling party privacy of claim 10 wherein said step of delaying comprises:

identifying completion of a predetermined time interval measured from an event which initiated said message connection.

15. The method of call screening for providing calling party privacy of claim 10 wherein said step of providing an indication comprises:

generating a subscriber sensible indication at said subscriber telephone station set, from the class of indications comprising: audible indication and visual indication.

16. The method of call screening for providing calling party privacy of claim 10 wherein said step of changing comprises:

bridging said subscriber onto said message connection in a three-way call connection for the duration of said message connection.

17. The method of call screening for providing calling party privacy of claim 7 wherein said step of bridging comprises:

terminating, in response to a subscriber provided input, recording of said incoming message.

18. The method of call screening for providing calling party privacy of claim 16 wherein said step of bridging comprises:

directly connecting, in response to a subscriber provided input, said subscriber to said calling party.

19. In a telecommunications system, which enables a subscriber, using a subscriber telephone station set, to monitor and intercept the processing of an incoming message directed to said subscriber and that is presently being input into a voice messaging system by a calling party, a call screening system for providing calling party privacy, comprising:

alert generation means, responsive to an incoming message directed to said subscriber and that is presently being input into said voice messaging system by said calling party, for providing an indication to said subscriber telephone station set; and alert delay means for delaying activation of said alert generation means during a programmable time period prior to said calling party recording said incoming message in said voice messaging system.

20. The call screening system for providing calling party privacy of claim 19 further comprising:

subscriber bridging means, responsive to expiration of said time period prior to said calling party recording said incoming message in said voice messaging system and said subscriber generating a control indication using said subscriber telephone station set, for changing the present state of the message connection between said calling party and said voice messaging system to enable said subscriber to monitor said incoming message presently being input into a voice messaging system via said subscriber telephone station set.

21. The call screening system for providing calling party privacy of claim 19 wherein said alert delay means comprises:

means for identifying completion of a prerecorded message provided by said voice messaging system.

22. The call screening system for providing calling party privacy of claim 19 wherein said alert delay means comprises:

means for identifying completion of a predetermined time interval measured from initiation of said message connection.

23. The call screening system for providing calling party privacy of claim 19 wherein said alert delay means comprises:

means for identifying completion of a predetermined time interval measured from an event which initiated said message connection.

* * * * *